(12) United States Patent
Vaysman

(10) Patent No.: US 10,304,089 B2
(45) Date of Patent: May 28, 2019

(54) TECHNIQUE FOR BILLBOARD ADVERTISING

(71) Applicant: Aintu Inc., San Jose, CA (US)

(72) Inventor: Arthur Vaysman, San Jose, CA (US)

(73) Assignee: Aintu Inc., San Jose, CA (US)

( * ) Notice: Subject to any disclaimer, the term of this patent is extended or adjusted under 35 U.S.C. 154(b) by 0 days.

(21) Appl. No.: 14/733,935

(22) Filed: Jun. 8, 2015

(65) Prior Publication Data

US 2015/0356618 A1 Dec. 10, 2015

Related U.S. Application Data

(60) Provisional application No. 62/009,133, filed on Jun. 6, 2014.

(51) Int. Cl.
 *G06Q 30/02* (2012.01)
(52) U.S. Cl.
 CPC ................ *G06Q 30/0267* (2013.01)
(58) Field of Classification Search
 CPC .... G06Q 30/00; G06Q 30/02; G06Q 30/0241; G06Q 30/0251; G06Q 30/0267
 USPC ............... 455/456.3; 235/462.01; 345/419
 See application file for complete search history.

(56) References Cited

U.S. PATENT DOCUMENTS

| | | | | |
|---|---|---|---|---|
| 6,957,775 | B2 * | 10/2005 | Tsikos | G06K 7/10722 235/462.01 |
| 2013/0222364 | A1 * | 8/2013 | Kraus | G06Q 30/02 345/419 |
| 2014/0004885 | A1 * | 1/2014 | Demaine | G06F 3/016 455/456.3 |
| 2014/0155098 | A1 * | 6/2014 | Markham | H04B 1/0064 455/456.3 |

FOREIGN PATENT DOCUMENTS

EP 2704083 A1 * 3/2014 ......... G06Q 30/0267

* cited by examiner

*Primary Examiner* — Marilyn G Macasiano
(74) *Attorney, Agent, or Firm* — HM Law Group LLP; Vani Moodley, Esq.

(57) ABSTRACT

A method for initiating an action responsive to a promotion. The method comprises causing placement of a visual indicator on a billboard, said visual indicator to indicate an existence of a promotion associated with an advertisement carried by the billboard; enabling a scanning process to cause a consumer to scan the visual indicator with a mobile device to generate scan data; and processing the scan data to initiate at least one action based on at least one pre-provisioned action a server system as part of said promotion.

9 Claims, 19 Drawing Sheets

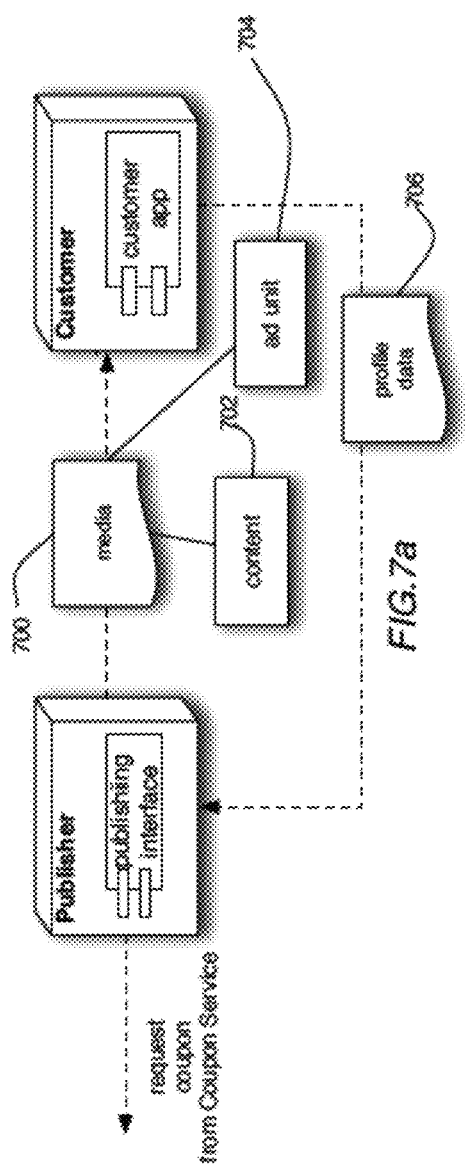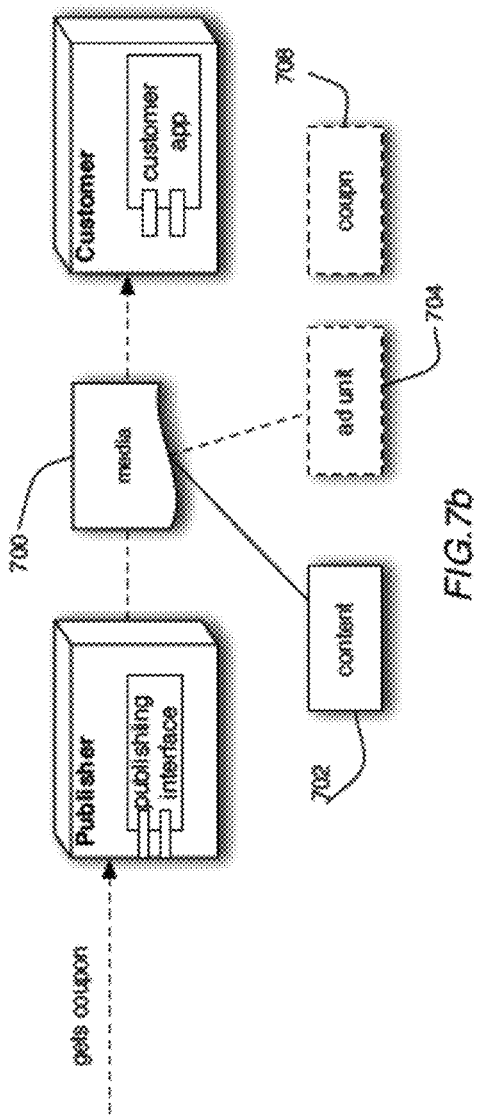

TECHNIQUE FOR BILLBOARD ADVERTISING

This application claims that the benefit of priority to prior U.S. provisional patent application No. 62/009,133 entitled "TECHNIQUE FOR BILLBOARD ADVERTISING", filed Jun. 6, 2014.

FIELD

Embodiments of the invention relate to advertising. In particular, embodiments of the invention relate to billboard advertising.

BACKGROUND OF THE INVENTION

Billboards commonly carry advertisements and represent an important channel for advertisers. In an attempt to engage with a prospective customer, a number may be printed on a billboard so that the prospective customer may be required to call said number in order to obtain more about a particular product or service. The aforementioned method for engaging with a prospective consumer is cumbersome because said consumer has to input the telephone number to which the text message is to be sent.

SUMMARY

Broadly, embodiments of the invention disclose techniques for a prospective consumer to receive a coupon associated with advertising content tied to a billboard, without the hassle of having to text message a number or having to make a call in order to receive said coupon. Said techniques may be implemented by a coupon generation system located in the cloud and accessible via a client coupon application provisioned on a client/user device such as a smartphone.

In one embodiment, all the prospective consumer needs to do is to turn on the client coupon app and to point the client device in the direction of the billboard of relevance. This causes the client coupon app to capture location and directional information and to transmit the same to the cloud based system, which responds by (a) identifying the consumer, (b) accessing the consumer's profile and (c) on an ad hoc basis, generating a highly personalized coupon offer which is then transmitted to the client coupon app for displaying and later clipping and/or use by the consumer.

Examples of client devices include smartphones, tablet computers, etc.

In one embodiment, when the prospective customer uses the client coupon app at a location where there is a billboard present, location data, derived for example from: GPS sensor, cell phone tower triangulation, nearby Wi-Fi networks, etc., associated with the client device is used to determine the particular billboard that is relevant (i.e. the one the consumer happens to be looking at). Thus, for example, the consumer may at an intersection or location where there is only one billboard in close proximity to the consumer. For such cases, the GPS location of the client device may be sufficient to identify the relevant billboard base on only the proximity information.

Alternatively, in the case of an intersection such as the intersection where there are multiple billboards positioned in close proximity to each other, location data is insufficient to determine the relevant billboard. Thus, in one embodiment, where the location data cross-referenced with billboard location data indicates that multiple billboards are present, then directional information may be used to perform a disambiguation process to identify the relevant billboard.

In one embodiment, for example, the consumer may be required to point a camera of the client device at the relevant billboard, or to simply hold the client device in such a manner that it is facing the appropriate billboard so that an internal sensors associated with the client device may be accessed in order to recover directional information. Said directional information may be used in the disambiguation process to identify the relevant billboard.

In one embodiment, in the case where there are multiple billboards that may be relevant and disambiguation is not possible, the system may pose a question to the consumer in order that the consumer may provide the information to identify the relevant billboard. In another embodiment, coupons associated with a plurality of billboards that are identified as likely to be relevant pursuant to the disambiguation process may be transmitted to the client coupon app. The prospective customer may then be given the opportunity to clip the coupons of interest and to reject coupons that are not of interest.

Advantageously, a consumer may be registered on the coupon generation system, and the system may over period of time collect information (profile information) about the consumer's purchasing habits so that the coupons or promotional offers may be personalized for that particular consumer.

It will be appreciated that the techniques disclosed herein may be advantageously use by a prospective consumer to receive a highly personalized promotional coupon offer associated with a billboard without the hassle of having to manually enter a telephone number.

Other aspects of the invention will apparent from the detailed description below.

BRIEF DESCRIPTION OF THE FIGURES

FIGS. 7*a-b* shows a Publisher publishing media on a Customer node, in accordance with one embodiment of the invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 14:
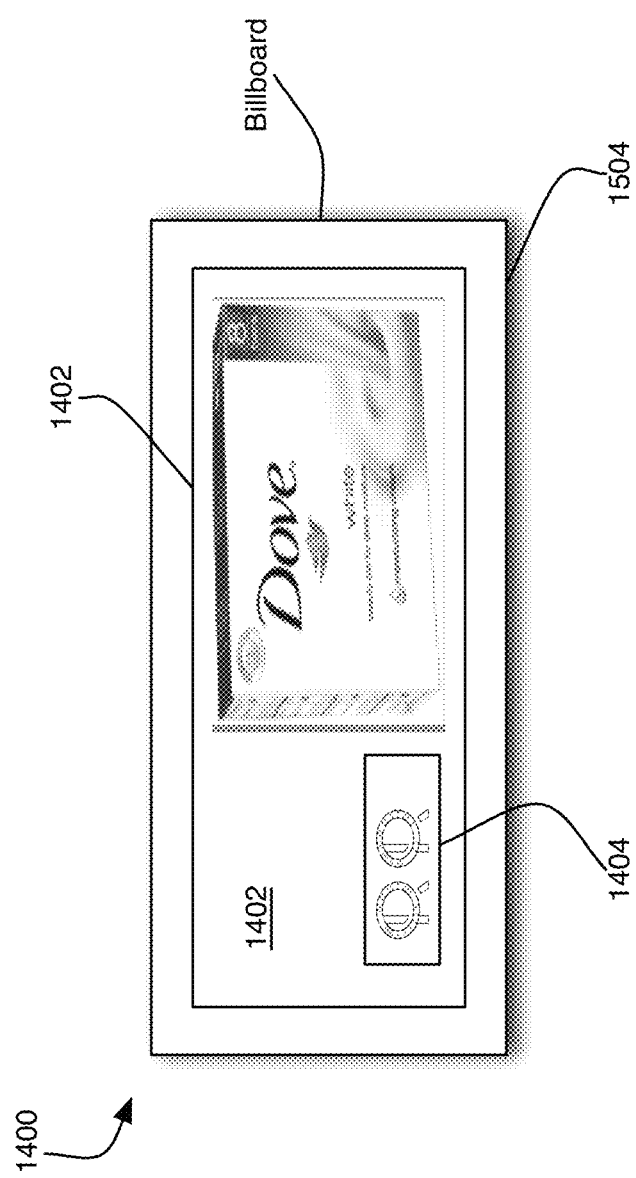
FIG. 14 shows a billboard with a visual indicator, in accordance with one embodiment of the invention.

Referring to FIG. 14 of the drawings, there is shown a billboard 1400 for use with embodiments of the present invention. The billboard 1400 includes advertising content in the form of an advertisement 1402 and a visual indicator 1404. In one embodiment, the visual indicator 1404 serves the purpose of indicating that there is a promotional offer or coupon associated with the advertising content 1402. The visual indicator 1404 is consistent with other indicators placed in association with display spaces such as product packaging, printed media, digital media, signage, etc. The idea is that the visual indicator 1404 provides a strong indication to a consumer of the existence of promotional material associated with content in the display space.

It is important to note that unlike other advertisements on billboards, there is no telephone number for a prospective consumer to text message to in order to learn more about a product or service to which the advertising content 1402 relates. Instead, and advantageously, a client coupon application (app), provisioned in a mobile phone of the prospective consumer may be used to obtain a promotional offer or coupon associated with the advertising content 1402, without the said user having to go through the trouble of sending a text message as will be explained in greater detail below.

Moreover, it is a further advantage of the techniques disclosed herein, that the promotional offer or coupon associated with the advertising content 1402 may be personalized for the prospective customer, as will be explained later.

Figure 15:
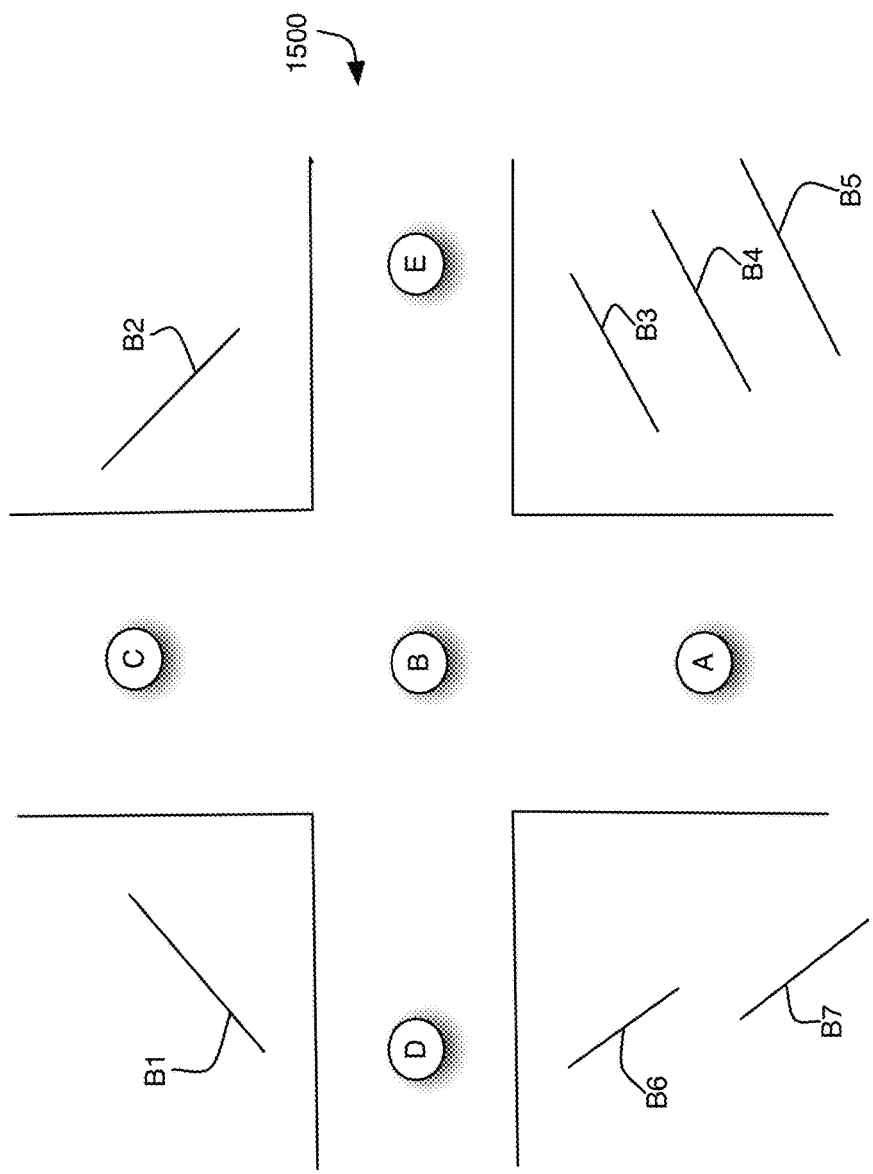
FIG. 15 shows an intersection with a plurality of billboards, in accordance with one embodiment of the invention.

Referring now to FIG. 15 of the drawings, a use case for the technology disclosed herein is described with reference to a 4-way intersection 1500. As will be seen, located at the 4-way intersection 1500, are a plurality of billboards B1 to B7. A prospective consumer may be located in the intersection 1500 at locations A through D. While standing at the location D, it is possible for the prospective consumer to be looking at billboard B2 or at any one of the billboards B3, B4, or B5. Embodiments the present technology discloses the use of location (GPS), and directional information in order to determine the precise billboard that the prospective consumer is looking at in cases where there are multiple possibilities for the latter. Once it is determined which billboard the prospective customer is actually looking at, then promotional offers or coupons associated with the billboard are delivered to the prospective consumer via the client coupon app, as will be described.

Figure 1:
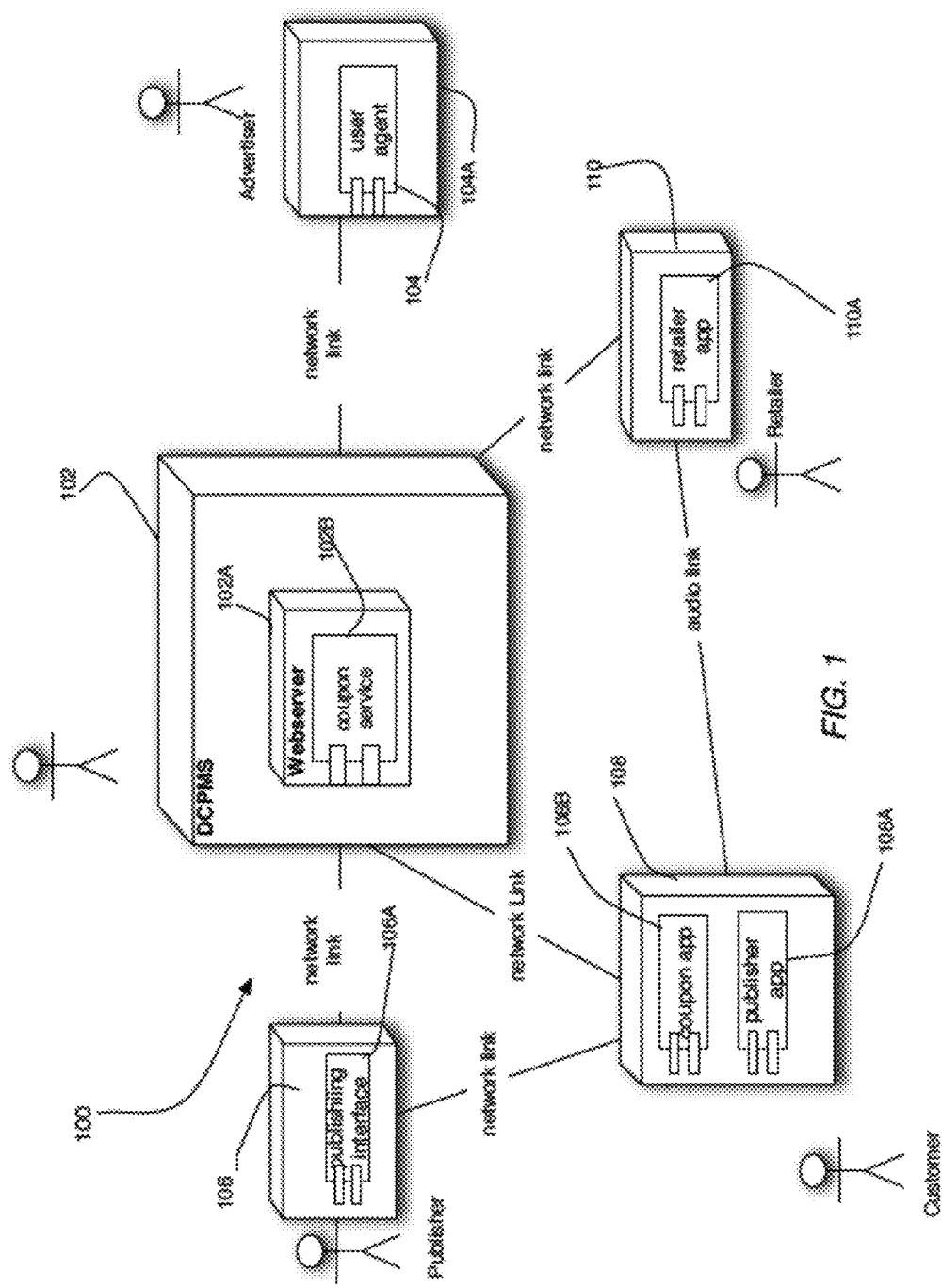
FIG. 1 shows a deployment drawing in accordance with one embodiment of the invention

FIG. 1 shows a deployment scenario 100 in accordance with one embodiment of the invention. Referring to FIG. 1 a coupon generation system referred to as a Digital Coupon Personalization and Management System (DCPMS) 102 includes a server component 102A which implements a Coupon Service (CS) 102B. The CS 102B is under control of a Coupon Service Provider (CSP). In one embodiment, a plurality of advertiser nodes 104 each equipped with an appropriate user agent (browser) 104A are communicatively coupled to the DCPMS 102 by means of a network link 112. Each advertiser node 104 may include a computing device such as a laptop or PC, and the network link 112 may comprise the Internet. Each advertiser node 104 represent an Advertiser who uses the CS to generate coupons on its behalf, as will be explained.

The DCPMS 102 may also be communicatively coupled with plurality of publisher nodes 106 by means of a network link 112. Each publisher node 106 represents a computing device such as a PC and includes a publishing interface 106A, which represent the mechanism whereby a Publisher is able to publish media on a customer node 108 for viewing by a Customer. Examples of Publishers includes CNN, Facebook, YouTube, etc.

The customer node 108 represents a customer device such as smartphone or tablet PC. In one embodiment, the customer node 108 may include a publisher app 108A and a coupon app 108B. The publisher app 108A may be configured to receive media content from a Publisher, as will be described more fully later. The media content may include a personalized coupon generated by the DCPMS 102.

Finally, the deployment scenario 100 also includes a retailer node 110 which represents retailer.

In one embodiment, the customer node 108 communicates with the retailer node 110 via an audio link 114.

Figure 2:
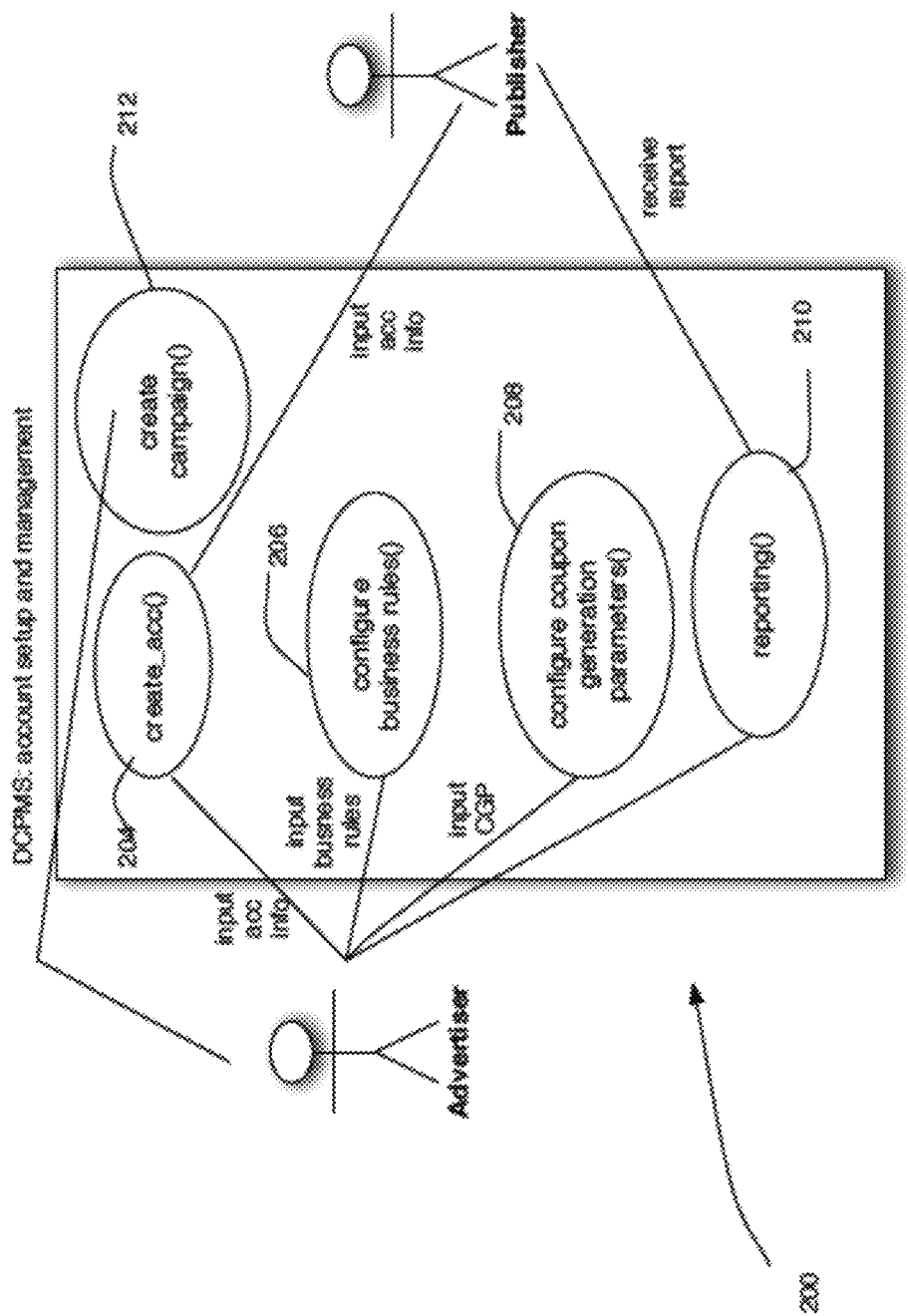
FIG. 2 shows the use cases for the DCPMS, in accordance with one embodiment of the invention.

FIG. 2 shows use cases 200 for the DCPMS 102, in accordance with one embodiment of the invention. As will be seen, the DCPMS 102 supports a create_account( ) function 202 which allows an Advertiser and a Publisher to create user accounts on the DCPMS 102. A configure_business_rules( ) function 208 allows an Advertiser to provision business_rules and objectives in the DCPMS 102. The business_rules and objectives may be used to generate highly personalized coupons for publishing to particular customers, as will be described. The use cases 200 also include a configure_coupon_generation_parameters( ) process 210 whereby an advertiser configures coupon generation parameters which are used to generate personalized coupons. Examples of coupon generation parameters include the following:

(a) Demographic data;
(b) Geographic data;
(c) Offer size for a coupon offer. This may be specified in the terms of a minimum offer size and a maximum offer size;
(d) The particular medium for which a coupon needs to be generated. Examples of media include video content, banner ads, and printed ads.
(e) Publisher. Examples of publishers includes Facebook, YouTube, CNN etc.;
(f) Context for the coupon. Examples of contexts includes sports, politics, science, business, lifestyle, etc.;
(g) Psycho-graphic information comprising values, opinions, attributes, interests, and lifestyles associated with a target demographic group.

The use cases 200 also include a reporting function 212 whereby reports are generated for Advertisers and Publishers.

Figure 3:
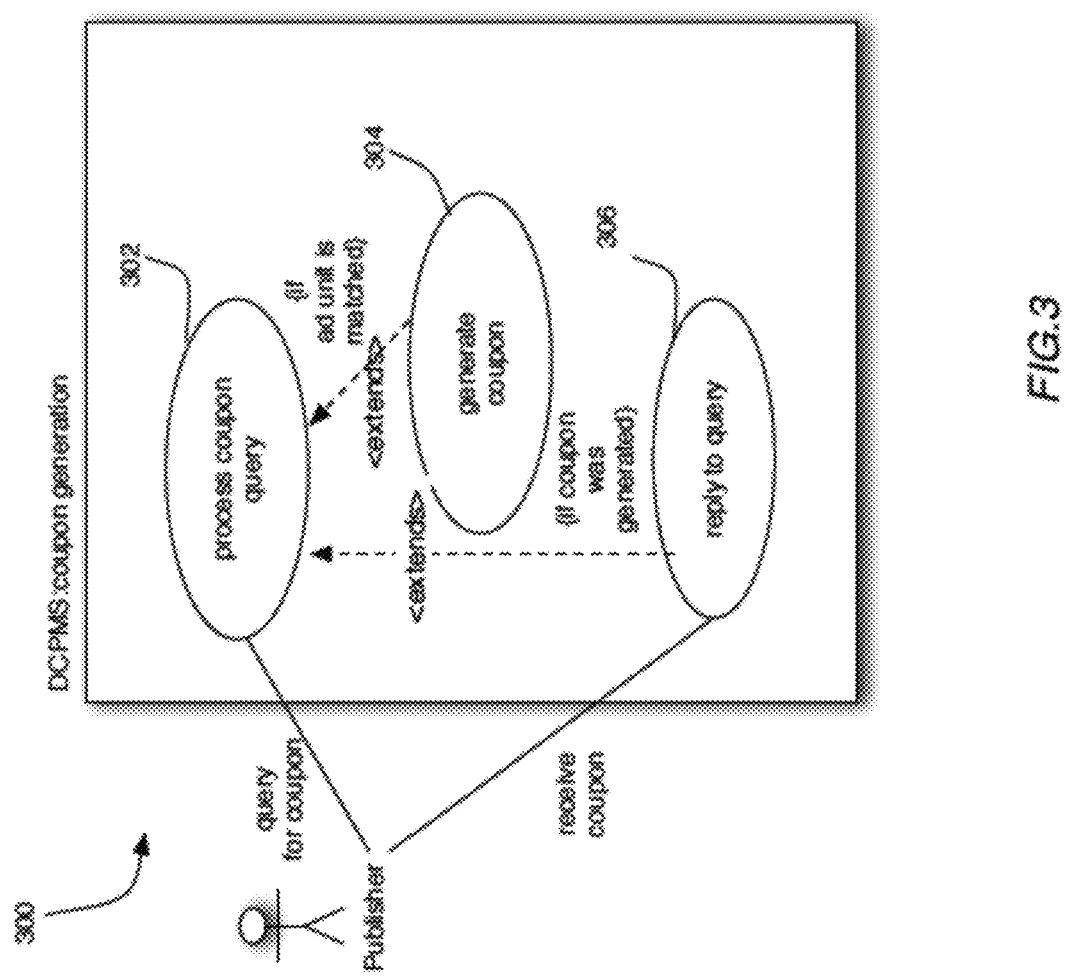
FIG. 3 shows the use cases for coupon generation, in accordance with one embodiment of the invention.
Figure 5:
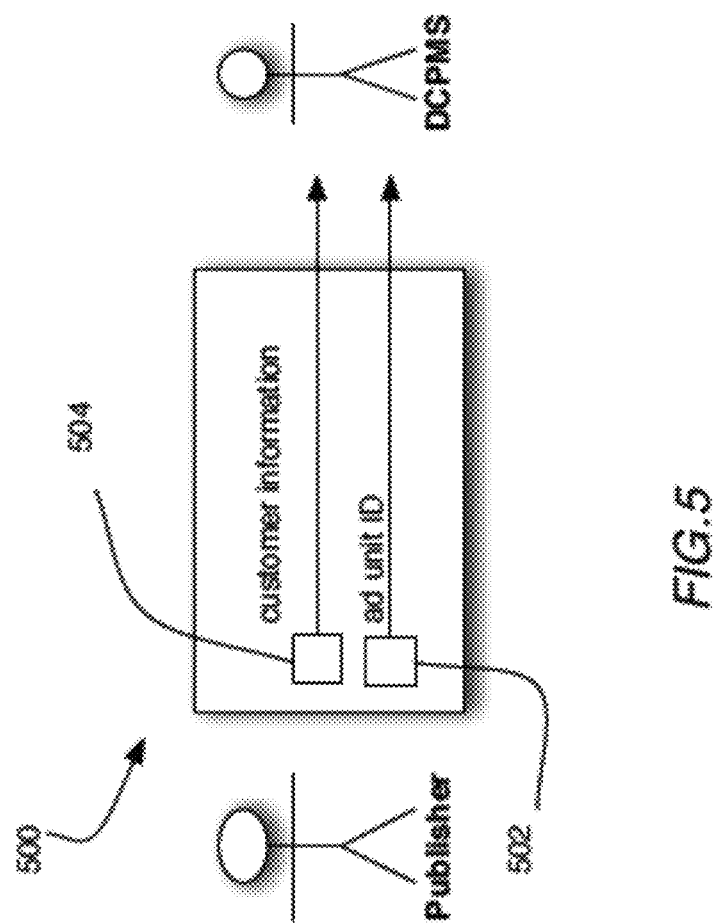
FIG. 5 shows a coupon query Q1, in accordance with one embodiment of the invention.

Referring now to FIG. 3 of the drawings, there is shown use cases 300 for coupon generation, in accordance with one embodiment of the invention. In terms of the use cases 300, a Publisher sends a query Q1 to the DCPMS 102. The query Q1 is a request for a coupon. Generally, at the time of sending the query Q1, the Publisher is already publishing content to a customer and is further typically displaying an advertisement unit (ad unit) in association with the content. This can be seen in FIG. 7a, which shows media 700 being published on a customer node 108, wherein the media 700 includes content 702 and an ad unit 704. FIG. 5 shows the elements of the query Q1, in one embodiment. As will be seen, Q1 includes customer information 500 and an ad unit id 502. The corresponds to the ad unit being shown to the Customer. The customer information corresponds to profile information/data 706 (see FIG. 8) about the Customer. The profile data 706 is collected from the Customer node 108 by the Publisher and includes that customer's browsing behavior and information about the customer device itself.

Responsive to receiving the coupon query Q1, the DCPMS 102 executes a process coupon query block 304. Under this block, the DCPMS 102 attempts to match the ad unit id in the coupon query Q1 in an ad unit list. The ad unit list is provisioned by an Advertiser and is basically a listing of ad units for which coupons must be generated by DCPMS 102. Thus, under the process 304, if the ad unit id is matched then a generate coupon function 306 is executed. Under this process, a personalized coupon is generated based on the coupon configuration parameters and based on machine learning techniques.

The use cases 300 also include a reply to query function 308 wherein the DCPMS 102 replies to the query Q1 by returning a coupon to the publisher 302 or a reply indicating that no coupon is available for the particular ad unit associated with the coupon request Q1. FIG. 7B shows the media 700 that is published on a customer node 108 as updated by the Publisher to include a coupon 708.

Figure 4:
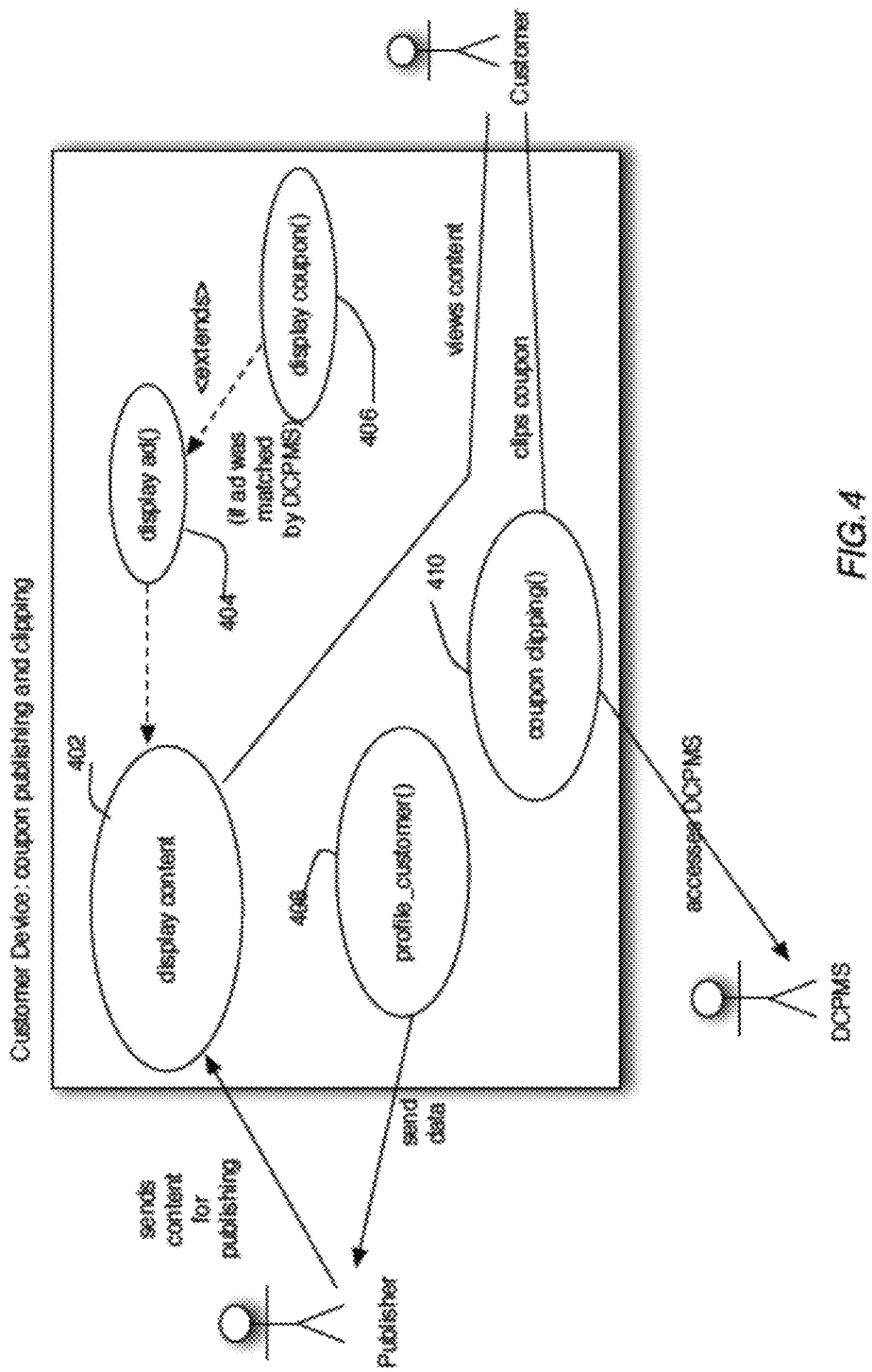
FIG. 4 shows the use cases for coupon clipping and publishing in accordance with one embodiment of the invention.

FIG. 4 shows use cases 400 for coupon displaying and clipping on the customer node 402, in accordance with one embodiment of the invention. As will be seen, the customer node 108 is configured to display content by executing a display content function 402. The display content function 402 may be extended to include a display ad function 404 which in turn may be extended to include a display coupon function 406 if the ad unit associated with the ad being displayed is match by the DCPMS 102, as described earlier. A profile customer( ) function 408 collects profile information for a customer which is transmitted to the Publisher. The use cases 400 also includes a coupon clipping( ) function 410. Under the coupon clipping function 410, a Customer performs a 'clipping action' in relation to a coupon. For example, in one embodiment, the clipping action may include selection of a clipping button associated with the coupon. Responsive to said clipping action, the coupon clipping function 410 generates a coupon clipping notification and transmits it to the DCPMS 102.

Figure 8:
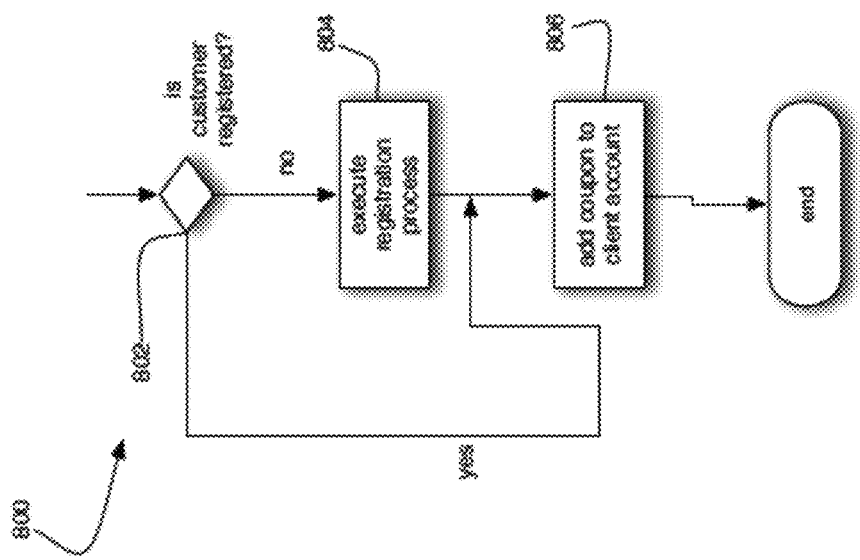
FIG. 8 shows a flowchart for processing a coupon clipping notification, in accordance with one embodiment of the invention.

Referring now to FIG. 8 of the drawings, there is shown a process 800 executed on the DCPMS 102 responsive to receiving a coupon clipping notification. At block 802, a check is made to determine if the customer is a registered customer. In one embodiment this step includes validating customer credentials included in the coupon clipping notification. If it is determined that the customer was not registered, then at block 804, a registration process is executed in order to register the customer. This process may include redirecting a customer to a registration page in order for the customer to input registration information. At block 806, the coupon identified by the coupon id in the coupon clipping notification is added to the customer's account. At this point, the DCPMS 102 may inform the Publisher that the coupon has been clipped, in which case the publisher may instruct a browser being used by the customer node 108 to view the coupon to stop displaying the coupon.

In the case where a Customer is using the coupon app 108B to view the published content, the coupon app 108B includes logic to stop showing the coupon as soon as the coupon clipping action is performed. Thus, a seamless coupon clipping experience is facilitated.

Figure 9:
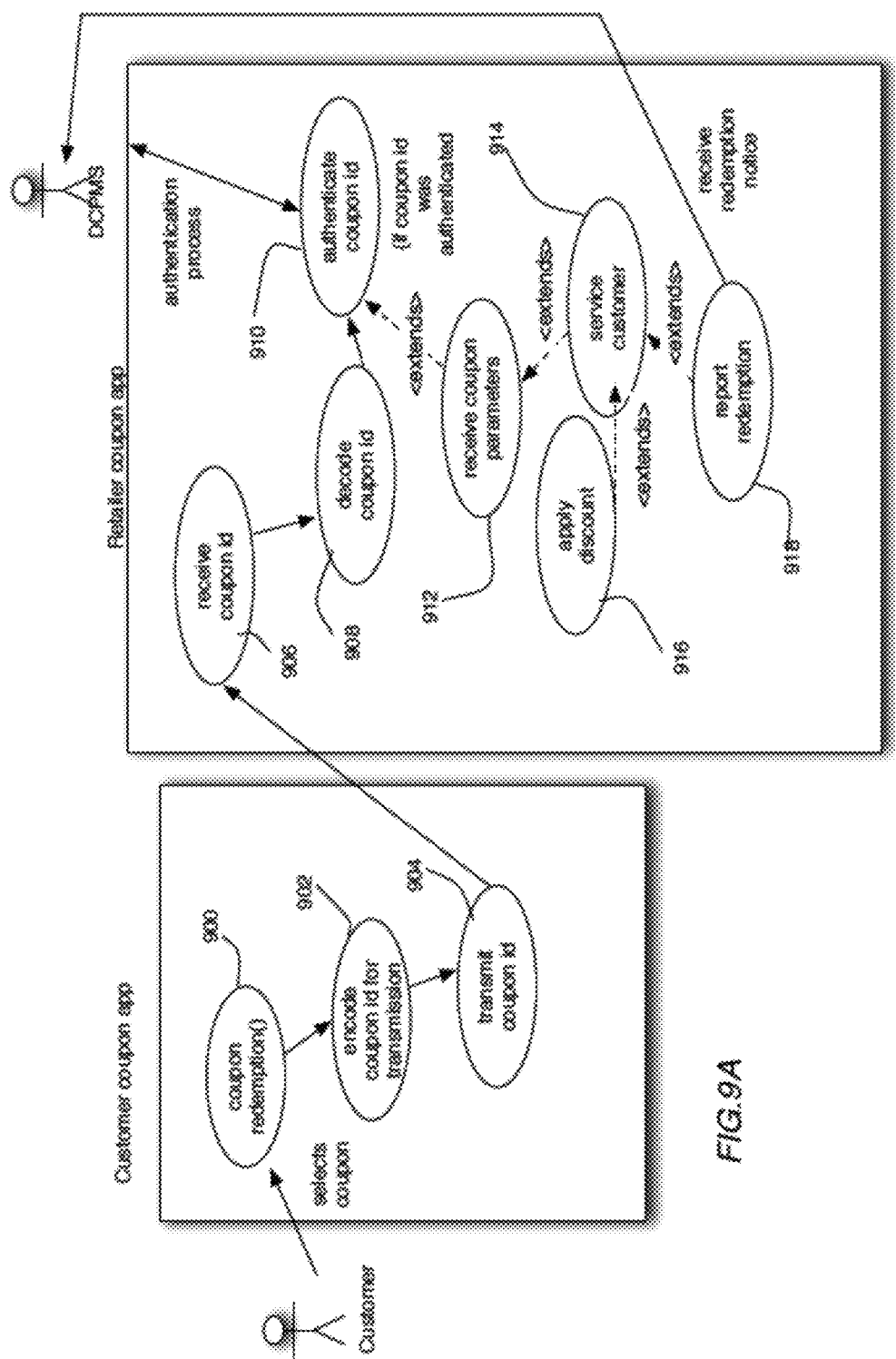
FIG. 9A shows the use cases for coupon redemption by the customer coupon app, in accordance with one embodiment of the invention.
FIG. 9B shows the use cases for coupon redemption by the retailer coupon app, in accordance with one embodiment of the invention.

Referring now to FIG. 9A of the drawings, there is shown a use case for coupon redemption by a Customer. As will be seen, a coupon redemption( ) function 900 includes a process 902 for encoding a coupon for transmission, and a process 904 for transmitting said encoded coupon to a retailer node. In one embodiment, the process 902 for encoding the coupon for transmission encodes the coupon as an audio signal which is then transmitted via a speaker associated with the customer node 108. The retailer node 110 then uses a microphone to detect the audio encoding. FIG. 9B also shows a use case for the retailer coupon app 110A to redeem a coupon, in accordance with one embodiment. Referring to FIG. 9B, process 906 comprises a receive coupon id( ) function whereby a microphone of the retailer node 110 is used to listen for the coupon transmission from the customer node 108. A decode coupon id( ) process 908 decodes the audio signal in order to extract the coupon id. An authenticate coupon id( ) process 910 includes transmission of the coupon id to the DCPMS 102 by the retailer coupon app for authentication. The DCPMS 102 authenticates the coupon id and returns coupon parameters associated with the coupon id that was authenticated. The retailer coupon app then executes a receive coupon parameters( ) function 912 to receive the coupon parameters from the DCPMS 102. A service customer( ) function 914 includes servicing the customer by providing the goods and/or services associated with the coupon. A apply discount( ) function 916 extends the service customer( ) function 914 to apply the discount indicated in the coupon to the transaction with the customer. A report redemption( ) function 918 includes operations to report any coupon redemption to the DCPMS 102.

Figure 6:
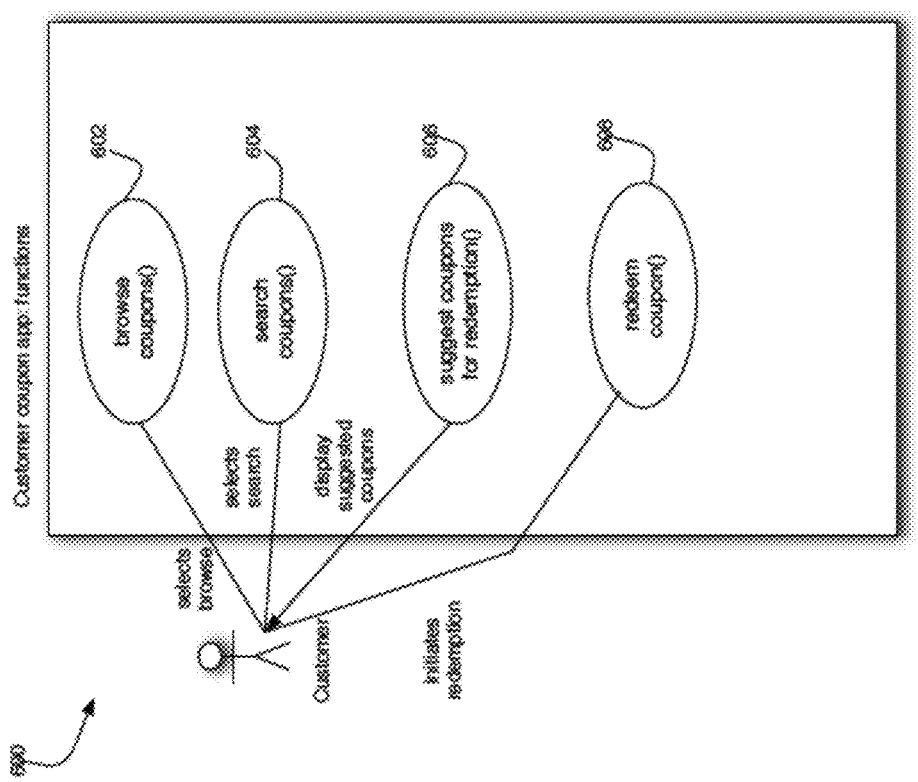
FIG. 6 shows the use cases for the customer coupon app, in accordance with one embodiment of the invention.

Referring now to FIG. 6 of the drawings, use cases 600 are associated with the coupon app 108B. As will be seen, the use cases 600 may include a browse coupons( ) function 602. This function allows a Customer to browse previously clipped coupons. A search coupon( ) function 604 allows the Customer to search for particular coupons based on search criteria. A suggest coupon for redemption( ) function 608 implements functionality to proactively suggest coupons for redemption to a Customer. For example, in one embodiment based on the location, the Customer may be shown coupons that are only available for redemption at that particular location. Finally, the use case 600 includes a redeem coupon function( ) 610, whereby the Customer may redeem a selected coupon, as has been described above.

Figure 10:
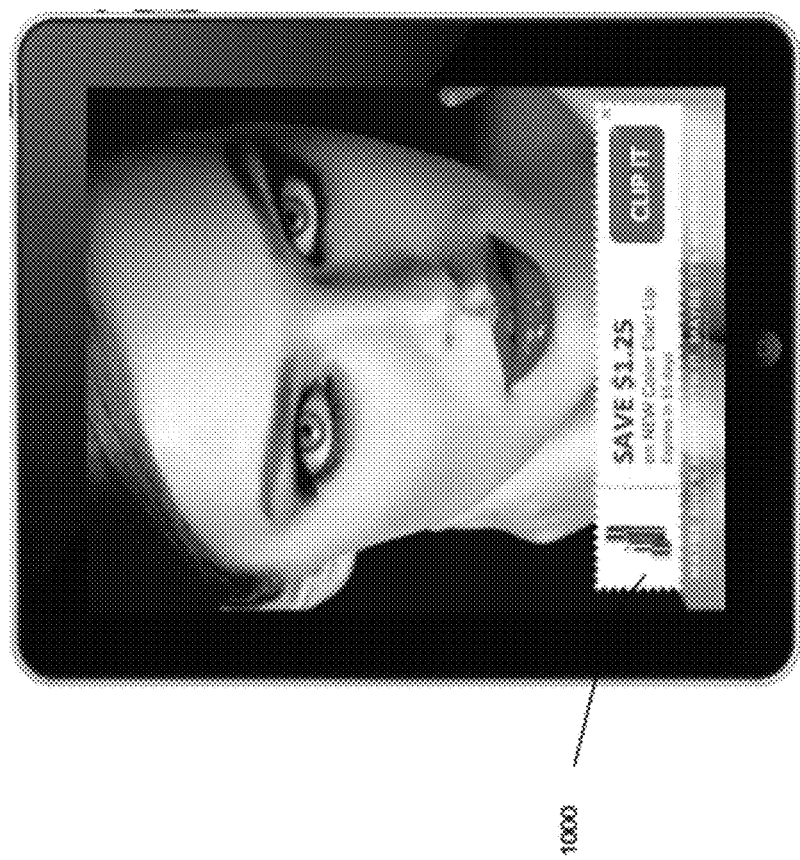
FIG. 10 shows an example of published coupon, in accordance with one embodiment of the invention.
Figure 11:
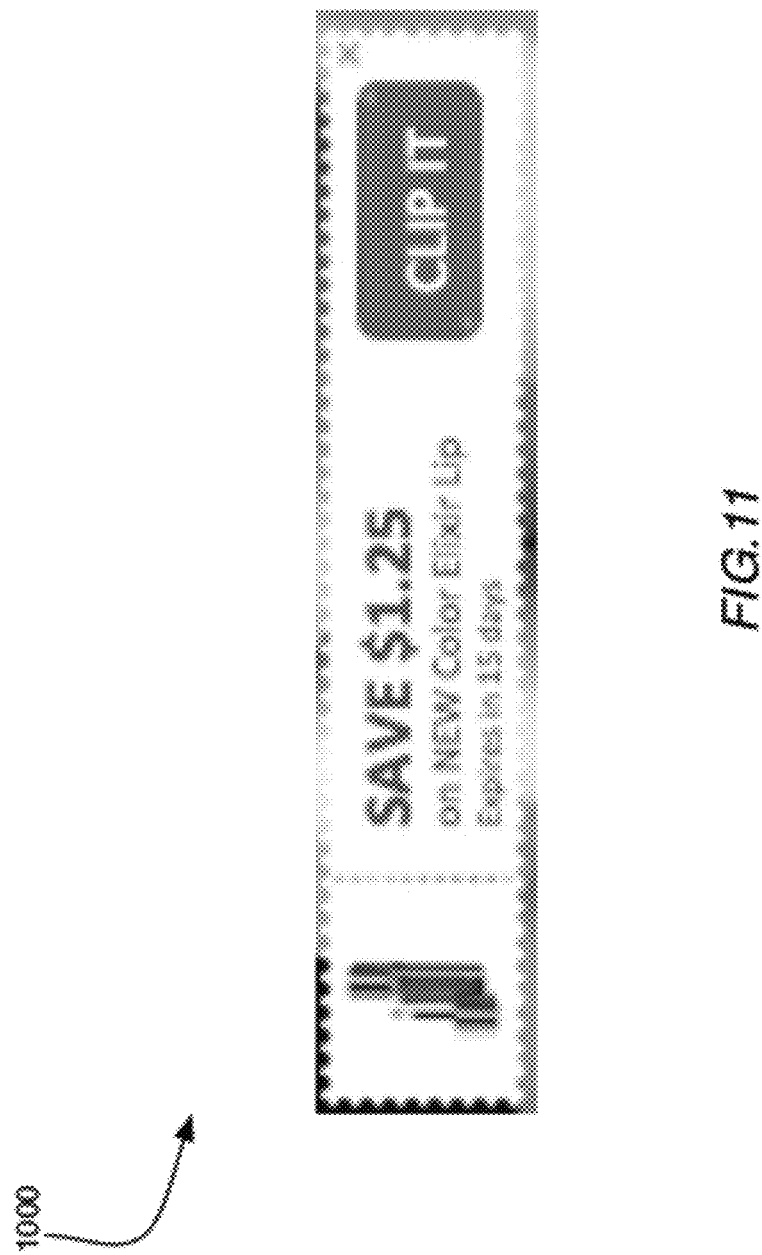
FIG. 11 shows the published coupon of FIG. 10 in magnified view, in accordance with one embodiment of the invention.

Referring now to FIG. 10 of the drawings, there is shown a coupon 1000 which is published in association with an advertisement for women's' lipstick. The coupon 1000 is shown in magnified view FIG. 11 of the drawings. As will be seen, the coupon 1000 includes a discount of $1.25, and a coupon expiration, which is set to 15 days. Further, the coupon 1000 includes a 'clip it button'. This button may be used to clip the coupon 1000 in accordance with the techniques disclosed herein.

Figure 12:
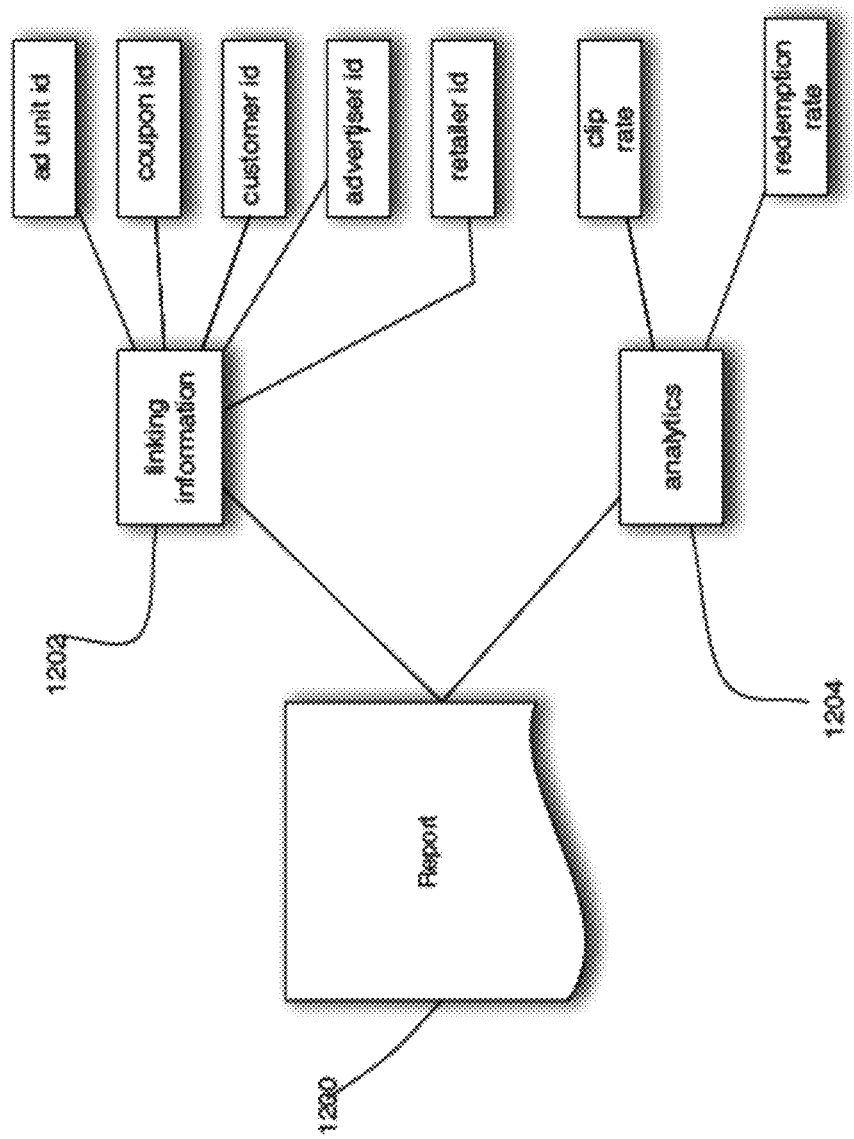
FIG. 12 shows an example of a report to an Advertiser, in accordance with one embodiment of the invention.

FIG. 12 shows a report 1200 that may be generated for an Advertiser, in accordance with one embodiment. The report 1200 includes linking information 1202 to link ad unit id, coupon id, customer id, advertiser id, and retailer id. Report 1200 also includes an analytics component 1204 which may provide detailed analysis on a coupon's clip rate and its redemption rate. The coupon clip rate and redemption rate may be used to optimize a coupon campaign. As has been mentioned, machine running techniques are used to generate a coupon in a dynamic fashion. For example, coupon may be configured to have a certain clip rate and a certain redemption. If a clip rate for a coupon is too high the system may dynamically reduce the discount associated with the coupon in order to throttle or scale back the redemption rate. Alternatively, if the coupon clip rate is too low, then the DCPM 102 S may dynamically increase the discount associated with the coupon in order to achieve the desired clip rate. Likewise, a coupons redemptions rate may be used to dynamically scale the offer sized associated with the coupon in order to achieve a desirable redemption rate.

Figure 13:
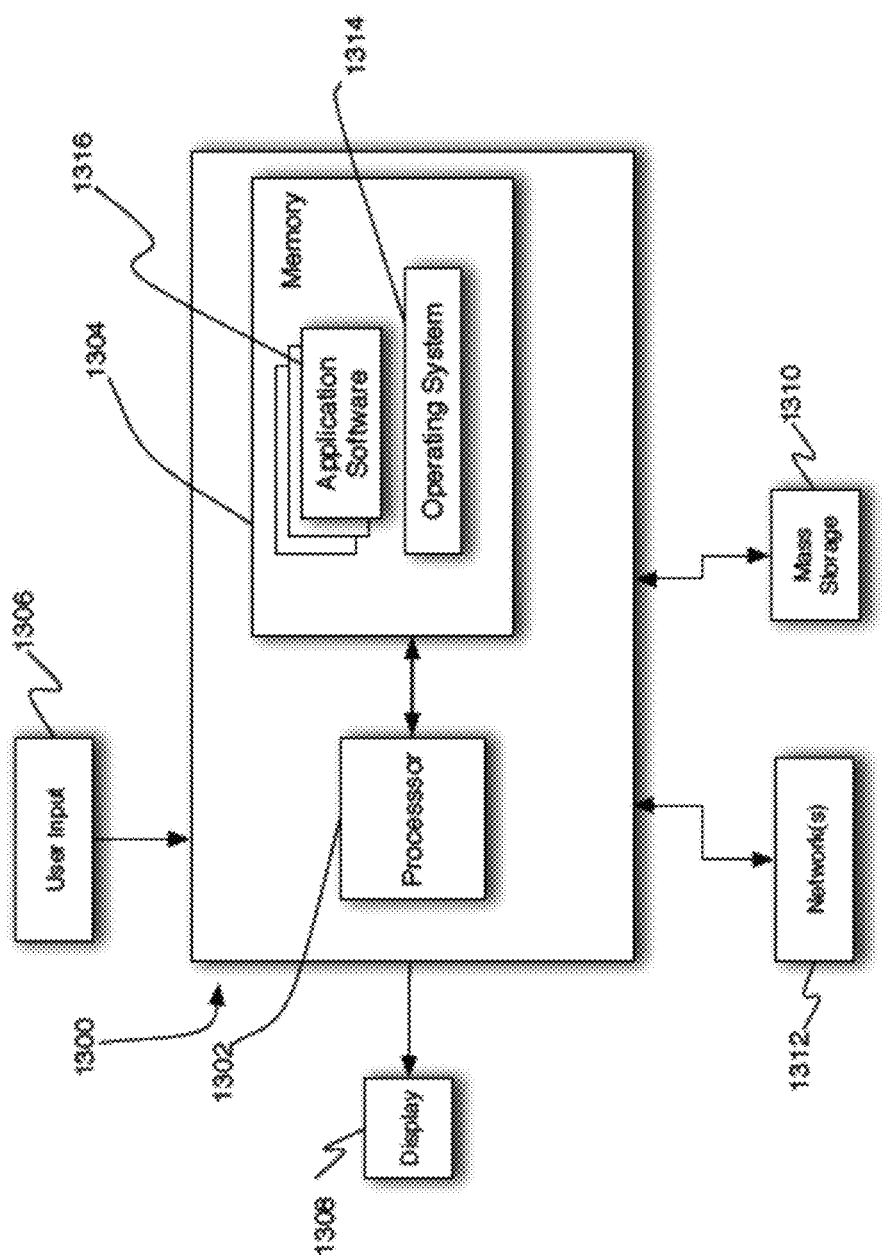
FIG. 13 shows a high-level block diagram of hardware for implementing the DCPMS, in accordance with one embodiment of the invention.

FIG. 13 shows an example of hardware 1300 that may be used to implement the DCPMS 102 in accordance with one embodiment. The hardware 1300 may include at least one processor 1302 coupled to a memory 1304. The processor 1302 may represent one or more processors (e.g., microprocessors), and the memory 1304 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1304 may be considered to include memory storage physically located elsewhere in the hardware, e.g. any cache memory in the processor 1302, as well as any storage capacity used as a virtual memory, e.g., as stored on a mass storage device.

The hardware also typically receives a number of inputs and outputs for communicating information externally. For interface with a user or operator, the hardware may include one or more user input output devices 1306 (e.g., a keyboard, mouse, etc.) and a display 1308. For additional storage, the hardware 1300 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1312 and each of the components, as is well known in the art.

The hardware 1300 operates under the control of an operating system 1314, and executes application software 1316 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 16:
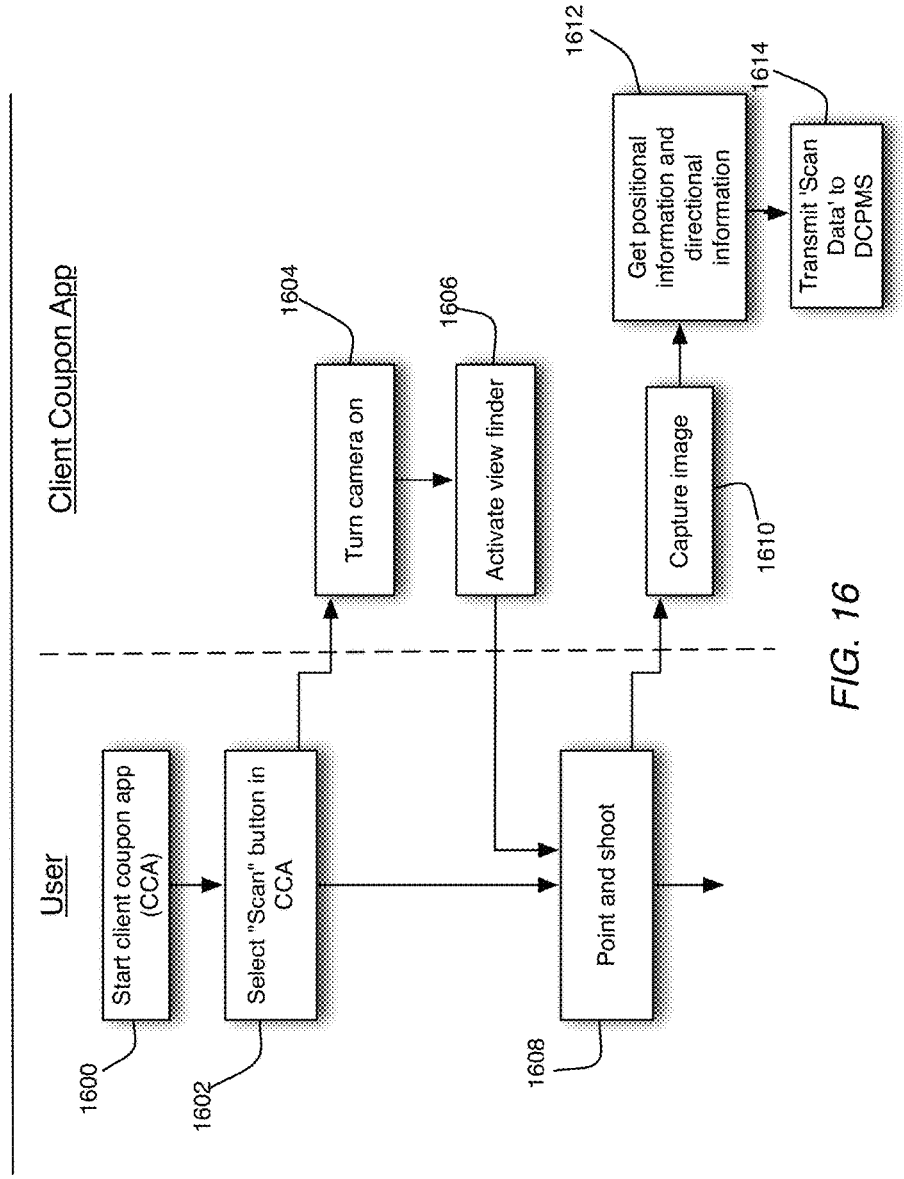
FIG. 16 shows a process for scanning a visual indicator, in accordance with one embodiment of the invention.

Turning now to FIG. 16, there is shown a flowchart of steps performed by a user or prospective customer in conjunction with the coupon app 108B in order to obtain a coupon associated with a billboard. The flowchart is for the situation where no billboard disambiguation is needed, a situation which occurs when there is a single billboard at a user's location. Typically, the user sees the visual indicator 1404 associated with advertising content 1402 on a billboard 1400 and recognizes that there is a promotional offer associated with said advertising content. This recognition is due to the presence of the visual indicator 1404.

To obtain the promotional offer, the user may start the coupon app 108B at block 1600. In some cases, the coupon app 108B may already be running. In one embodiment, a user interface of the coupon app 108B may include a "scan" button. In use, the user selects the scan button at block 1602 to trigger a scanning process. The scanning process may include turning on a camera of the client device associated with a customer node 108. This is indicated by block 1604.

At block 1606, a view finder is activated and may be used to provide assistance to the user to frame the visual indicator 1404 and to shoot an image thereof at block 1608.

Responsive to completion of the "point and shoot" block 1608, the coupon app 108B captures the image of the visual indicator 1404 at block 1610. Image data corresponding to the image may be stored in a memory associated with the client device. Thereafter, at block 1612 executes wherein positional and directional information for the client device is obtained. Positional information refers to location data generated by a location sensor of the client device. In one embodiment, the location sensor may comprise a GPS sensor and the location data may include latitude and longitude data indicating the location of the client device.

In some embodiments, the "point and shoot" block 1608 may only simulate and the capturing the image of the visual indicator 1404 but in reality may not actually capture said image.

The directional information may include an expression of the direction the client device was pointing to at the time of capturing the image of the visual indicator 1404. The directional information may be derived from data captured by a magnetic sensor associated with the client device. In one embodiment, said directional information may be expressed as a bearing in the range of 0 to 360 degrees. The image data, positional data, and directional data may be referred to a "scan data" for ease of reference. At block 1614, the client device transmits the scan data to the DCPMS 102 the network link 112.

Figure 17:
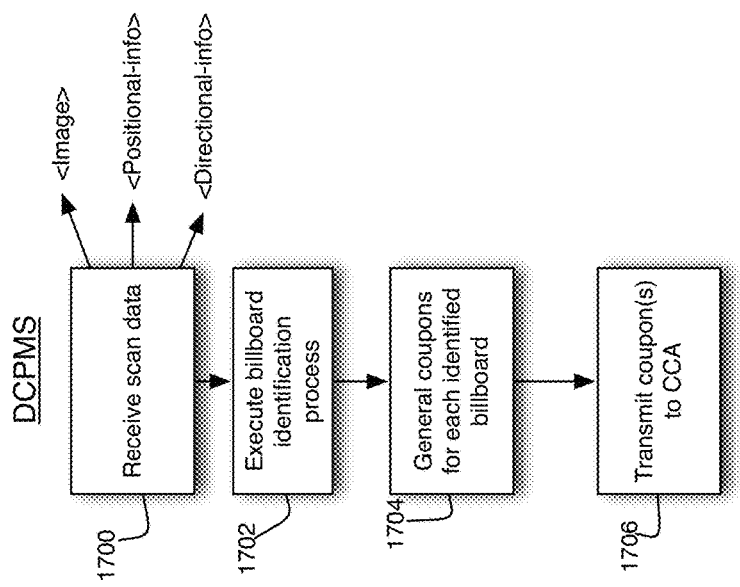
FIG. 17 shows a process for generating a coupon based on scan data, in accordance with one embodiment of the invention.

Referring now to FIG. 17, at block 1700, the DCPMS 102 receives the scan data from the client device, and executes a billboard identification process 1702 to identify the relevant billboard (i.e. the one that the user was looking at) based on the scan data. The processing steps corresponding to the billboard search/identification process 1702, in accordance with one embodiment of the invention, are shown in FIG. 18.

Figure 18:
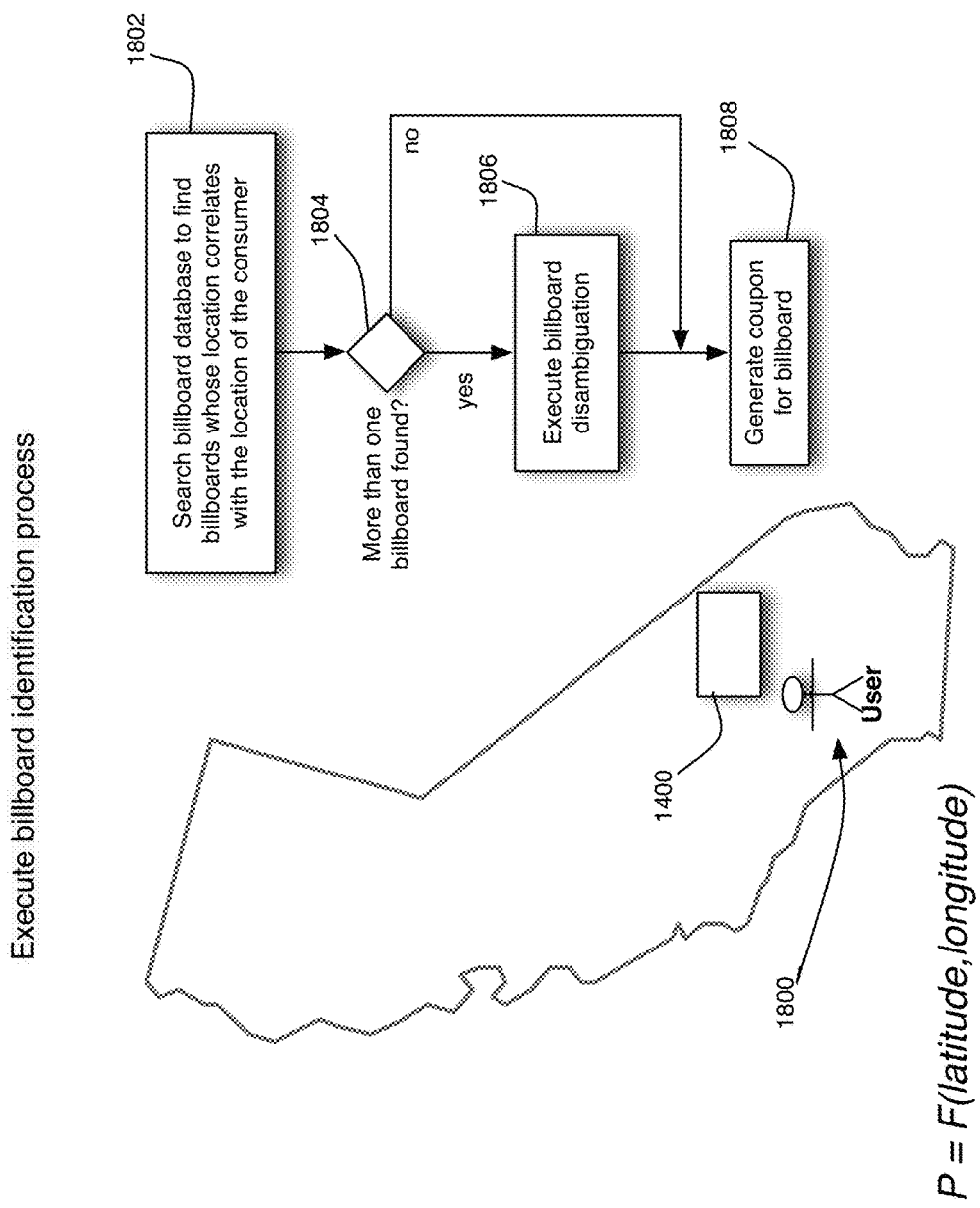
FIG. 18 illustrates a billboard disambiguation process, in accordance with one embodiment of the invention.

Referring to FIG. 18, a user 1800 has a position or location P which is a function of the user's latitude and longitude. Moreover, the location P corresponds to the location of a billboard 1400 which bears a visual indicator 1404 indicated in the scan data. This is referred to as the simple case because there is only one billboard 1400 at the user's location. To begin the process of finding the relevant billboard, the DCPMS 102 searches a billboard database to find billboards whose location correlates with the location of the user 1800. This step is indicated by reference numeral 1802 in FIG. 18.

The billboard database may be a component of the DCPMS 102 or it may be an external component that is accessed via an interface (e.g. network link plus application program interface (API)) thereto.

In one embodiment, the billboard database may comprise a plurality of billboard records, each comprising a mapping of a billboard to its location L. The location L may be expressed as a function of the latitude and longitude. Thus, one of ordinary skill in the art would appreciate that the search process 1802 involves searching the billboard database for billboards that have a location that matches the location of the user as indicated in the scan data. The searching performed under the block 1802 is based on the positional data included in the scan data.

In a more complex case, there may be more than one billboard that may be found based on a match of billboard location to user location as a result of the process 1802. This can occur for example in the case where the user is at an intersection at which there are multiple billboards, each located at one corner of said intersection, as is the case of the 4-way intersection 1500 shown in FIG. 15. Therefore, at block 1804 the DCPMS 102 forks execution flow based on whether not more than one billboard was found by process 1802. If only one billboard was found the control passes to block 1808, wherein a coupon is generated for the single billboard that was found, as will be explained later.

Figure 19:
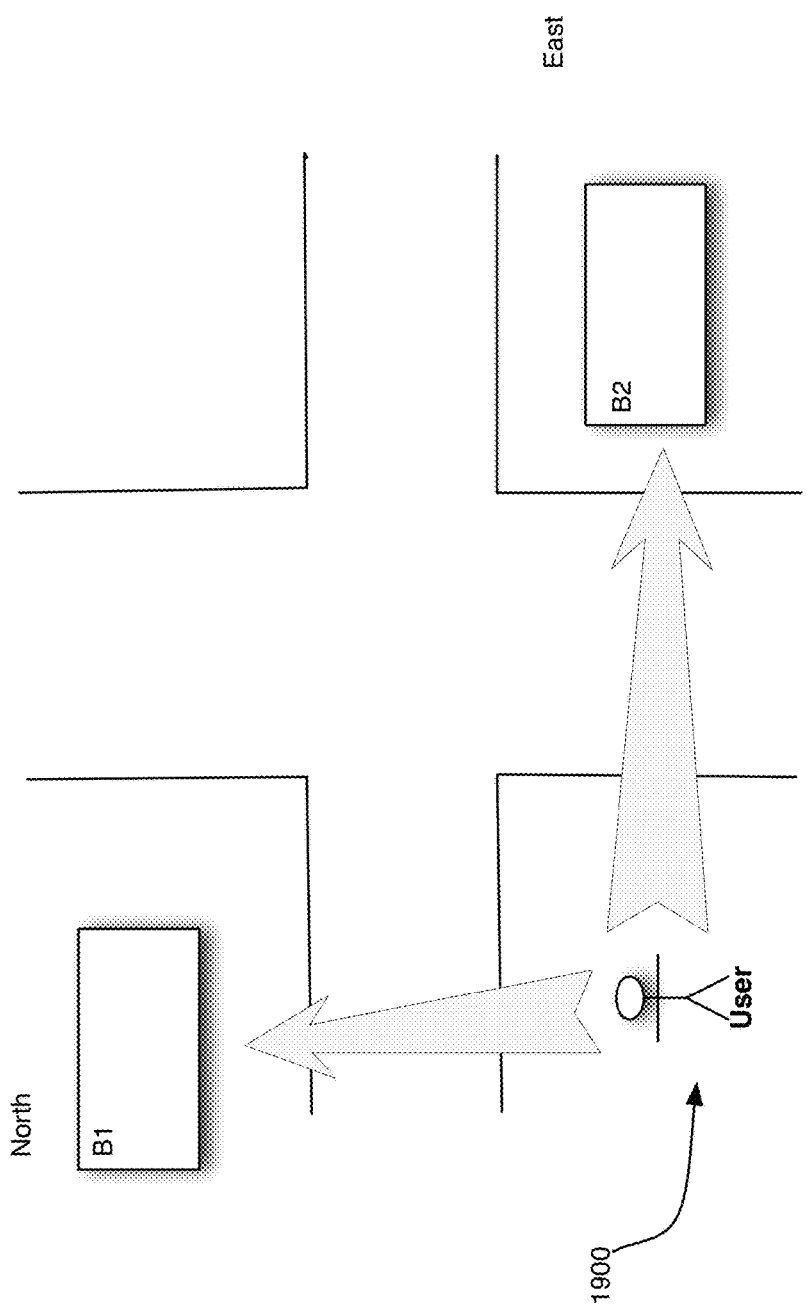
FIG. 19 illustrates how directional tags may be used to facilitate billboard disambiguation, in accordance with one embodiment of the invention.

In the case where more than one billboard was found by the search process 1802, then control passes to block 1806 wherein a billboard disambiguation process is executed to identify the particular billboard that is relevant i.e. the one that the user was looking at when the scan data was generated. In one embodiment, the disambiguation process involves using the directional data associated with the scan data. The process is described with reference to FIG. 19, which shows a user 1900 located at an intersection. The intersection includes a billboard B1 that is located more or less in a northerly direction relative to the user 1900. The intersection also includes a billboard B2 that is located roughly to the east of the user 1900. Because the billboards B1 and B2 are close together, the positional data included in the scan data sent to the DCPMS 102 may lack the granularity or resolution to distinguish which of the billboards B1 and B2 the user 1900 was looking at when the scan data was captured.

For the disambiguation process of block 1806, in one embodiment, the DCPMS 102 processes the directional information in the scan data received for the user 1900 to determine which of the billboards is the relevant. One embodiment of this processing will now be described. For this embodiment, consider the case where the scan data from the user 1900 is for the billboard B1 in the example of FIG. 19. For this case, the directional information in the scan data will indicate that the user 1900 was facing north when the scan data was captured. However, if the billboard B2 was the subject of the scan then the directional information in the scan data will indicate that at the time of the scan, the user 1900 was facing east. Thus, in one embodiment, to support the disambiguation process 1806, the billboard database may provide information on billboard groups. Each billboard group may include billboards therein based on an inclusion rule that includes those billboards in the billboard database that are too close in a spatial sense and for which the disambiguation process described herein will be needed in order to find the relevant billboard in said group. Thus, each billboard group has a location and a listing of billboards at that location. Additionally, each billboard in a billboard group may be assigned a disambiguation factor to be used in the disambiguation process of block 1808 identify the relevant billboard. One disambiguation factor may include a directional tag assigned to each billboard in a billboard group. In the case of the example of FIG. 19 billboard B1 is assigned the directional tag "north"; and the billboard B2 is assigned the directional tag "east". The disambiguation process then includes matching the directional information in the scan data with the directional tag to identify the relevant billboard.

The disambiguation process of block 1806 will not work if more than one billboard in a group has the same directional tag. This could occur when multiple billboards are vertically stacked at the same location. For this case, all billboards with the same directional tag will be deemed to be relevant and certain user actions will need to performed in order to determine the billboard of relevance. These user actions will be described later.

Upon completion of the block 1806, control passed to block 1808. As noted above, the block 1808 includes steps to generate coupons for the each relevant billboard. These steps are similar to the use case 300 for coupon generation described above. To support the coupon generation process, each billboard is assigned an ad unit and each ad unit has an ad id. The ad id is used by the DCPMS 102 to query for any coupons associated with ad unit. The coupons are dynamically generated in accordance with the techniques described above. Moreover, the coupons may be personalized as described above. The coupons that were generated are then sent to the coupon app 108B B for clipping and redemption in accordance with the techniques already described.

In the case where billboard disambiguation could not be achieved because more than one billboard shared the same directional tag, coupons are generated and sent to the user for each billboard with the same directional tag. The user the user action of clipping only the coupons of interest. In one embodiment, coupons that are not clipped are regarded as being of no interest and will be deleted from the coupon app 108B after a certain time. Alternatively, the coupon app 108B may provide a user interface option (e.g. a selectable button) that offers the user the option to perform the user action of explicitly deleting or rejecting the coupons that are of no interest. In one embodiment, the user may be asked a question in order that the consumer may provide the information to identify the relevant billboard.

Thus far scanning of a visual indicator associated with a display space such as a billboard has been described to generate scan data which can be user to trigger creation of a coupon for a promotion associated with the billboard. However, it is to be understood that in other embodiments of the invention the scan data may be used to trigger other actions provisioned the DCPMS 102. For example, in one embodiment, the scan data may trigger shipment of a product sample to the consumer. In another case the scan data may trigger actions to purchase an item associated with the display space. For the latter case, the DCPMS 102 may be configured to generate an offer to buy akin to a coupon, wherein the offer to buy includes and embedded "buy button" which is displayed to the consumer via the coupon app 108B, there enabling the consumer to effect the purchase of a promotional item in a seamless and frictionless manner.

The actions to be triggered may be pre-provisioned in the DCPMS 102, in accordance with one embodiment. In some cases more than one action may be triggered responsive to the san data. For example, a sample of a promotional item may be sent to the consumer in addition to generating a coupon for the consumer. In some cases, the coupon may be sent first, and if the coupon is not redeemed within a predefined time then the sample may be shipped to the consumer to incentivize purchasing of the promoted item.

The invention claimed is:

1. A method for initiating an action responsive to a promotion, comprising:
   in a server communicably connected to a service provider and a consumer through a network:
   causing placement of a visual indicator on a billboard, said visual indicator to indicate an existence of a promotion associated with an advertisement carried by the billboard;
   enabling a scanning process to cause the consumer to scan the visual indicator with a mobile device to generate scan data,
   wherein said scan data comprises positional information for the mobile device, and
   wherein in order to provide assistance in the scanning process a view finder is activated;
   determining the billboard indicated in the scan data comprises matching the positional information in the scan data with real world location data for a plurality of billboards in a billboard database,
   wherein the real world location data include latitude information and longitude information for each of the plurality of billboards; and
   transmitting the scan data to the server for processing the scan data to initiate at least one action comprising coupon generation by the server as part of said promotion;
   delivering, by the server, said generated coupon to said mobile device; and
   encoding the delivered coupon as an audio signal by the mobile device.

2. The method of claim 1, wherein the action initiated further comprises at least one of: shipping a sample of a promotional item and generating an offer to purchase the promotional item.

3. The method of claim 1, wherein the scan data further comprises directional information for the mobile device.

4. The method of claim 1, further comprising performing a billboard disambiguation process to identify the billboard indicated in the scan data in case where the more than one billboard is identified based on said matching.

5. The method of claim 4,
   wherein the scan data further comprises directional information for the mobile device, and
   wherein the billboard disambiguation process comprises performing matching the directional information in the scan data with a directional tag associated with each billboard with matching location.

6. The method of claim 5, wherein a coupon is generated for each billboard matched based on matching of the positional and directional information.

7. The method of claim 6, wherein each coupon is generated dynamically and is personalized for the consumer.

8. The method of claim 7, further comprising a coupon clipping process to allow the consumer to select each coupon of interest.

9. The method of claim 1, further comprising:
   choosing the visual indicator to at least partially match a graphical element associated with an application provisioned in the mobile device, and
   choosing which application is used to perform the scanning process.

* * * * *